US012649070B2

(12) United States Patent
Kvryan

(10) Patent No.: US 12,649,070 B2
(45) Date of Patent: Jun. 9, 2026

(54) FACE AEROGEL COVER EQUIPMENT

(71) Applicant: The United States of America, as represented by the Secretary of the Navy, Crane, IN (US)

(72) Inventor: Armen Kvryan, Glendale, CA (US)

( * ) Notice: Subject to any disclaimer, the term of this patent is extended or adjusted under 35 U.S.C. 154(b) by 885 days.

(21) Appl. No.: 17/948,494

(22) Filed: Sep. 20, 2022

(65) Prior Publication Data

US 2023/0093340 A1 Mar. 23, 2023

Related U.S. Application Data

(60) Provisional application No. 63/246,033, filed on Sep. 20, 2021.

(51) Int. Cl.
*A62B 23/02* (2006.01)
*B01D 39/16* (2006.01)
*B01D 39/20* (2006.01)

(52) U.S. Cl.
CPC ........ *A62B 23/025* (2013.01); *B01D 39/1676* (2013.01); *B01D 39/2051* (2013.01); *B01D 2239/0241* (2013.01); *B01D 2239/1216* (2013.01)

(58) Field of Classification Search
None
See application file for complete search history.

(56) References Cited

U.S. PATENT DOCUMENTS

| | | | |
|---|---|---|---|
| 2004/0038818 A1* | 2/2004 | Risen, Jr. ................. | B01J 21/08 502/407 |
| 2007/0090346 A1* | 4/2007 | Jeong ................ | H01L 21/32055 423/566.1 |
| 2015/0068974 A1* | 3/2015 | Kong ................. | B01D 53/1487 95/143 |
| 2016/0015098 A1* | 1/2016 | Conlon .............. | A41D 13/1115 29/428 |
| 2020/0171426 A1* | 6/2020 | Li ........................... | B01D 53/32 |
| 2021/0290993 A1* | 9/2021 | Callado ................... | B32B 3/266 |
| 2022/0007754 A1* | 1/2022 | Kaiserman ........... | A41D 31/145 |
| 2023/0135711 A1* | 5/2023 | Dankovich ........... | A61M 16/06 128/205.25 |
| 2023/0201800 A1* | 6/2023 | Snapp-Leo ............ | A41D 13/11 422/4 |

* cited by examiner

*Primary Examiner* — Bradley H Philips
(74) *Attorney, Agent, or Firm* — Naval Surface Warfare Center, Crane Division; Christopher Feigenbutz

(57) ABSTRACT

Provided is a protective mask that includes one or more layers of an air-permeable aerogel. The aerogel can be nonmetallic, metallic, metallic oxide, semi-conductive, or any combination thereof. The protective mask can include a nonmetallic interior layer and a metallic or metallic oxide exterior layer surrounding the nonmetallic interior layer. Alternatively, the facemask can include a semi-conductive layer, a power source, and a customizable switch. The pore size of the aerogel can be selected from a size ranging from <1 to 100 nanometers based on intended use. One or more layers can be incorporated into a facemask or respirator filter to protect a user from nanometric airborne particles, harmful chemicals used in industry, and the like. The filter is reusable and the pore size can be customized to deny entry to almost any size of particulate that is desired.

12 Claims, 6 Drawing Sheets

101

102

101

201

301

FACE AEROGEL COVER EQUIPMENT

CROSS-REFERENCE TO RELATED APPLICATIONS

The present application claims priority to U.S. Provisional Patent Application Ser. No. 63/246,033, filed Sep. 20, 2021, entitled "FACE AEROGEL COVER EQUIPMENT," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 210,797US01) is assigned to the United States Government and is available for licensing for commercial purposes. Licensing and technical inquiries may be directed to the Technology Transfer Office, Naval Surface Warfare Center Port Hueneme Division, email: Alan.w.jaeger@navy.mil or phone (805) 205-0638.

FIELD OF THE INVENTION

The field of invention relates generally to personal protective equipment (PPE). More particularly, it pertains to a PPE facemask or filter that contains one or more layers of an air-permeable aerogel.

BACKGROUND

According to the FDA, respirators, such as N95 respirators and surgical masks are examples of personal protective equipment (PPE) that are used to protect the wearer from airborne particles and from liquid contaminating the face. The Centers for Disease Control and Prevention (CDC) National Institute for Occupational Safety and Health (NIOSH) and the Occupational Safety and Health Administration (OSHA) also regulate N95 respirators. During the COVID-19 Pandemic it was made clear that personal protective equipment (PPE) was very scarce. This was in part due to not having enough stock and the level of protection that was needed. N95 masks were deemed sufficient protection and were in high demand.

There have been many calls to conserve medical PPE for emergency and first responders. One example is the Journal of the American Medical Association (JAMA) which seeks creative immediate solutions from individuals who have relevant experience, including physicians, other health care professionals, and administrators in hospitals and other clinical settings for how to maximize the use of PPE, to conserve the supply of PPE, and to identify new sources of PPE. As is evident from the above, it is clear that there is a need for new types of PPE, including PPE masks that can be reused. In this end, the present invention substantially fills this need.

SUMMARY OF THE INVENTION

The present invention relates to a protective mask that includes one or more layers of an air-permeable aerogel. The aerogel can be nonmetallic, metallic, metallic oxide, semi-conductive, or any combination thereof. In an illustrative embodiment, the protective mask includes a nonmetallic interior layer and a metallic or metallic oxide exterior layer surrounding the nonmetallic interior layer. Alternatively, the facemask can utilize a semi-conductive layer with a power source and a customizable switch. The pore size of the aerogel can be selected from a size ranging from <1 to 100 nanometers based on intended use. In one embodiment, one or more layers are incorporated into a facemask or respirator filter to protect a user from nanometric airborne particles, harmful chemicals used in industry, and the like. The filter is reusable and the pore size can be customized to deny entry to almost any size of particulate that is desired.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Generally, provided is a protective mask comprising, one or more layers of an air-permeable aerogel comprising a nonmetallic interior layer and a metallic exterior layer surrounding the nonmetallic interior layer. In an illustrative embodiment, the air-permeable aerogel further comprises a pore size in the range of 0.1 to 100 nanometers. In an illustrative embodiment, the nonmetallic interior layer comprises Carbon, Nitrogen, and Oxygen. In an illustrative embodiment, the nonmetallic interior layer by weight consists of 85-92% Carbon, 1-5% Nitrogen, and 4-10% Oxygen. In an illustrative embodiment, the metallic exterior layer comprises a metal. In an illustrative embodiment, the metallic exterior layer comprises copper or a copper alloy. In an illustrative embodiment, the nonmetallic interior layer is doped with a metal to form the metallic exterior layer. In an illustrative embodiment, the nonmetallic interior layer is doped with is doped with a metal oxide to form the metallic exterior layer. In an illustrative embodiment, the layers are incorporated into a respirator filter.

In an illustrative embodiment, provided is a protective mask comprising, one or more layers of an air-permeable semiconducting aerogel connected to a power source with a customizable switch. In an illustrative embodiment, the semiconducting aerogel comprises a metal chalcogenide aerogel. In an illustrative embodiment, the power source comprises a battery, a power plug, or a solar panel. In an illustrative embodiment, the customizable switch comprises a power switch.

In an illustrative embodiment, provided is a protective mask comprising, a first layer comprising one or more layers of an air-permeable aerogel comprising a nonmetallic interior layer and a metallic exterior layer surrounding the nonmetallic interior layer; and a second layer comprising an air-permeable semiconducting aerogel connected to a power source with a customizable switch.

In an illustrative embodiment, provided is a protective mask comprising, one or more layers of an air-permeable metallic aerogel.

Figure 1:
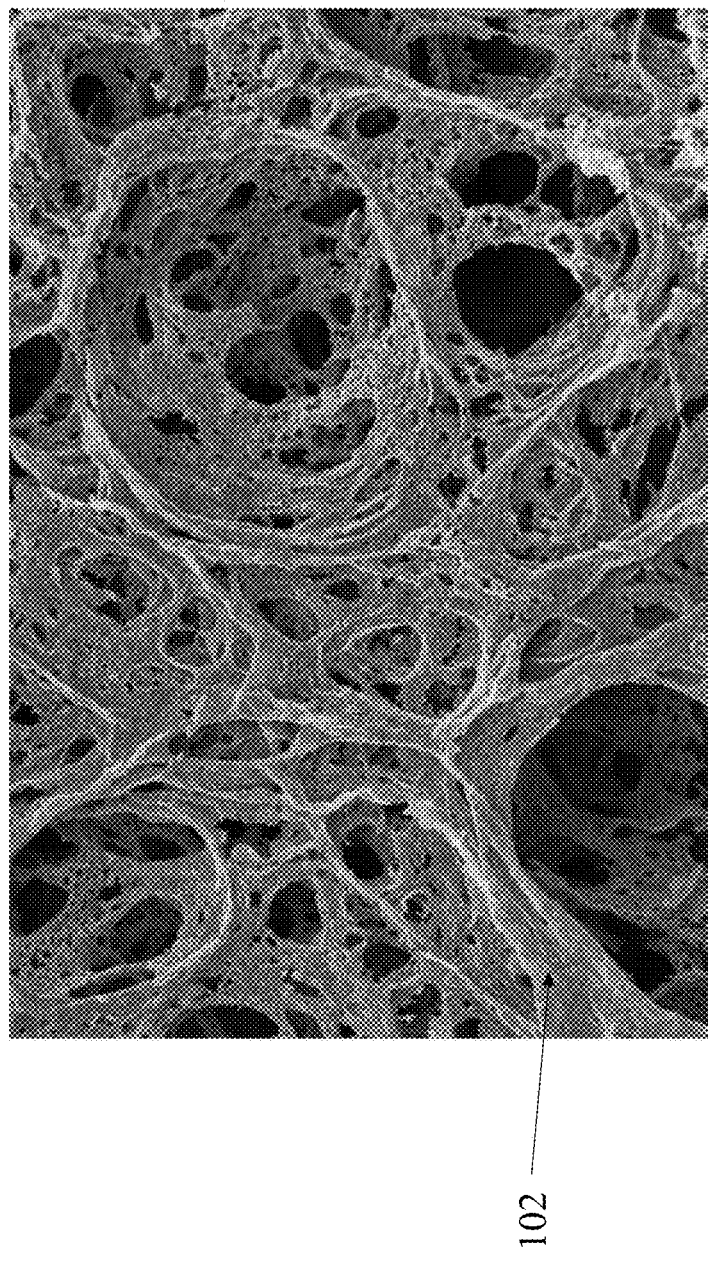
FIG. 1 shows a close-up cross-section of the porosity of an aerogel matrix.

FIG. 1 shows a close-up cross-section of the porosity of an aerogel matrix 101. Aerogels are solid materials that are composed of approximately 99.8% air, wherein the material creates a porous matrix 101. As can be appreciated, aerogels make up a class of synthetic porous ultralight materials that are derived from a gel, wherein the liquid component for the gel is replaced with a gas and without significant collapse of the gel structure. The result is a solid material with extremely low density and thermal conductivity. Aerogels are produced by extracting the liquid component of a gel through supercritical drying or freeze-drying. This process permits the liquid to be slowly dried and removed without causing the solid matrix in the gel to collapse via capillary action, as happens with conventional evaporation. Aerogels can be made from a variety of chemical compounds. In an illustrative embodiment, aerogels can be made from silica, carbon, metals, metallic oxides, and semiconducting compounds.

Figure 2:
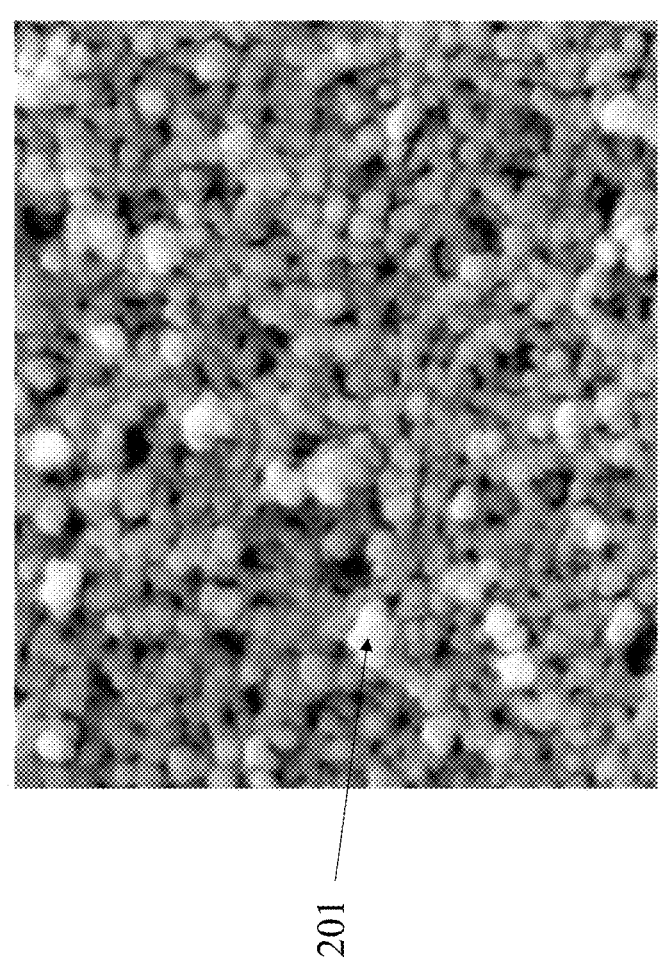
FIG. 2 shows a close-up cross-section of the porosity of an aerogel matrix used as filter media.
Figure 3:
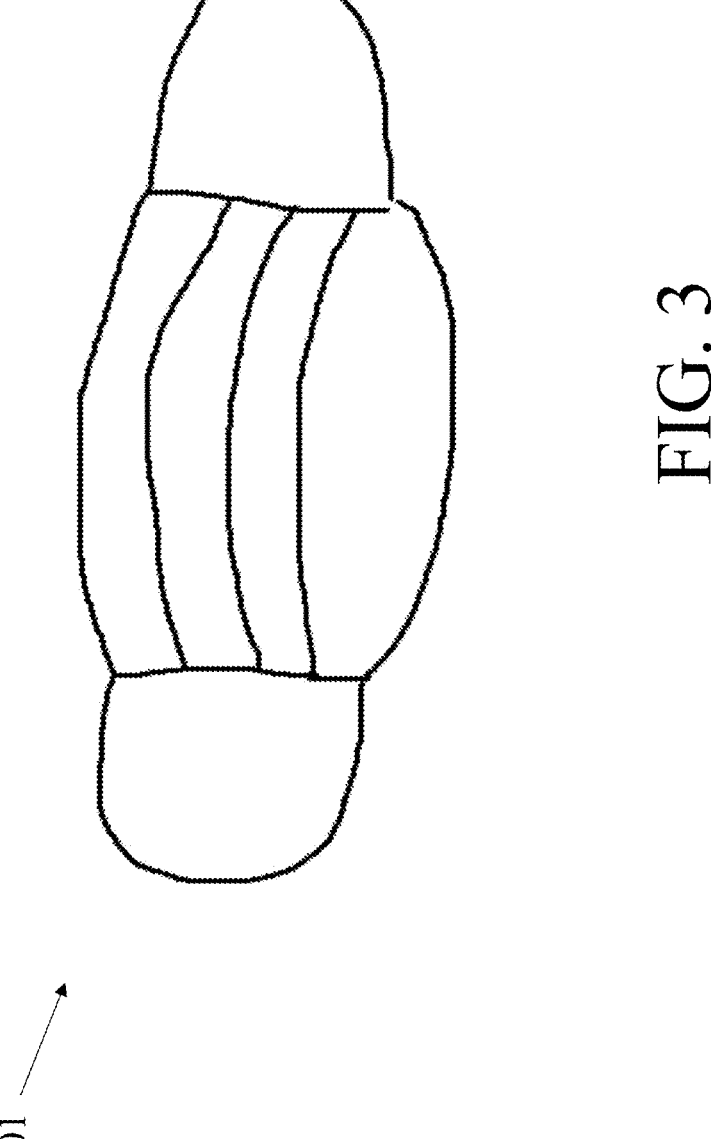
FIG. 3 shows a view of a protective facemask.

FIG. 2 shows a close-up cross-section of the porosity of an aerogel matrix 101 used as filter media 201, and FIG. 3 shows a protective facemask 301. In an illustrative embodiment, the aerogel can be incorporated into one or more layers of personal protective equipment (PPE). In an illustrative embodiment, the PPE is a protective facemask 301, surgical mask, or respirator comprising an aerogel used as filter media 201. In an illustrative embodiment, the aerogel comprises a pore size ranging from <1 to 100 nanometers based on intended use. As can be appreciated, customizing the pore size of the aerogel enables the PPE to be used in a variety of applications, such as to protect a user from nanometric airborne particles, harmful chemicals used in industry, and the like.

In an illustrative embodiment, the aerogel for use in the PPE is doped by one or more metals. In an illustrative embodiment, the aerogel comprises Carbon, Nitrogen, Oxygen, and a metal, as shown in Table 1. In an illustrative embodiment, the percentage of Carbon within the aerogel can range from 85-92%, the percentage of Nitrogen within the aerogel can range from 1-5%, the percentage of Oxygen within the aerogel can range from 4-10%, and the percentage of metal within the aerogel can range from 0-3%.

TABLE 1

| Example of Aerogel Composition Table (atomic %) | |
| --- | --- |
| Carbon | 85-92 |
| Nitrogen | 1-5 |
| Oxygen | 4-10 |
| Metal | 0-3 |

Figure 4:
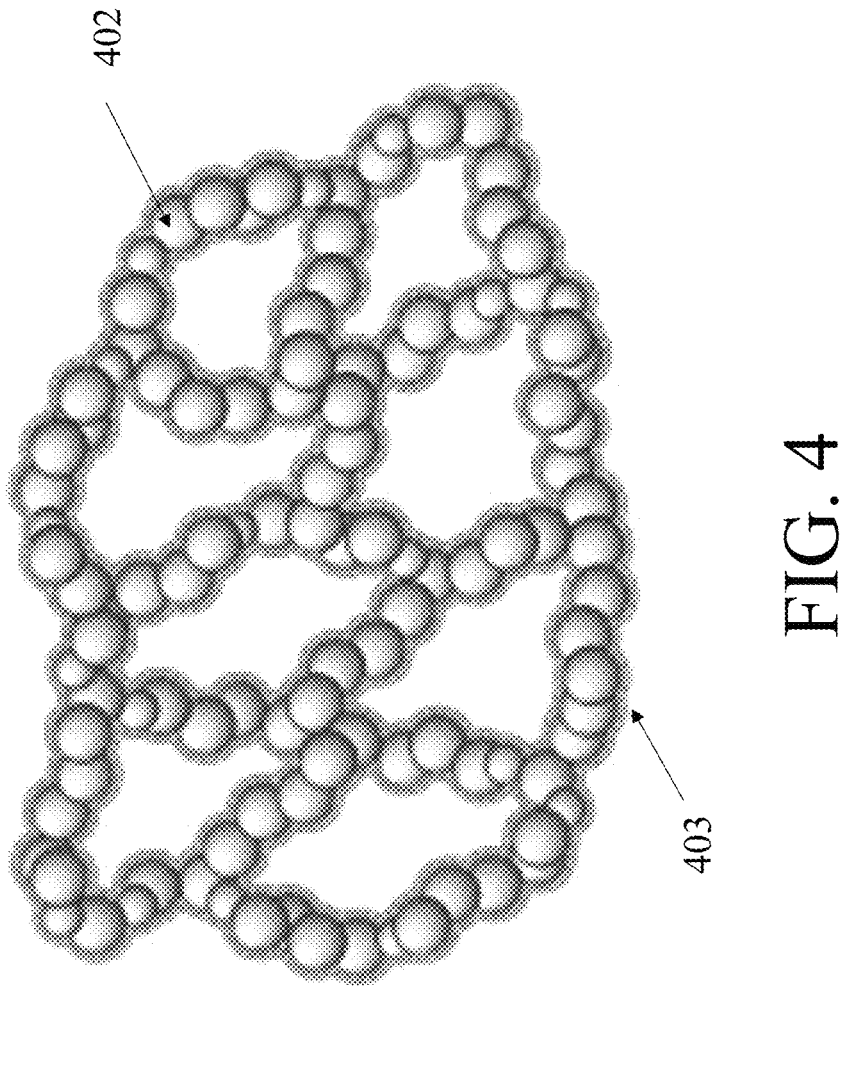
FIG. 4 shows an aerogel structure found within filter media comprising a nonmetallic interior and a metallic exterior that can hinder biological growth.

FIG. 4 shows an aerogel structure 401 found within filter media comprising a nonmetallic interior 402 and a metallic exterior 403 that can hinder biological growth. In an illustrative embodiment, the protective mask 301 comprises one or more layers of an air-permeable aerogel comprising a nonmetallic interior layer 402 and a metallic exterior layer 403 surrounding the nonmetallic interior layer 402. In an illustrative embodiment, the nonmetallic interior layer 402 comprises Carbon, Nitrogen, or Oxygen as disclosed in Table 1. In an illustrative embodiment, the metal can be any metal. In an illustrative embodiment, the metal is a transition metal as described in the Periodic Table of the Elements. In an illustrative embodiment, the metal is a transition metal from Periods 4-7 as described in the Periodic Table of the Elements. In an illustrative embodiment, the metal is copper or a copper alloy (brasses, bronzes, cupronickel, copper-nickel-zinc, and the like). As can be appreciated, copper is known to have antimicrobial properties that can hinder biological growth of bacterial, viruses, and the like. The nonmetallic interior layer 402 can be doped with the metal to form the metallic exterior layer 403.

Figure 5:
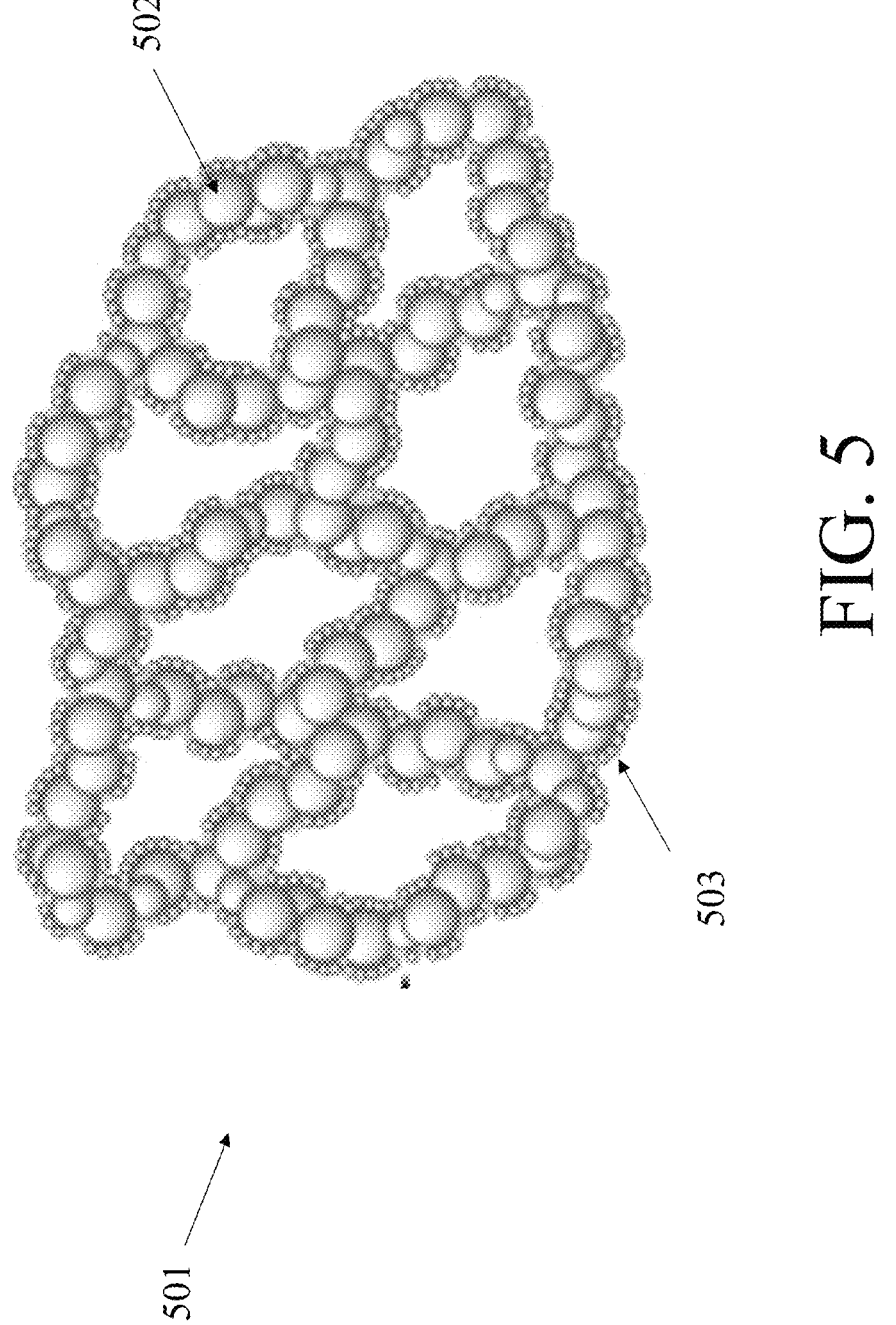
FIG. 5 shows an aerogel structure found in filter media that is doped with a metal oxide.

FIG. 5, shows an aerogel structure found in filter media that is doped with a metal oxide. In an illustrative embodiment, the protective mask 301 comprises one or more layers of an air-permeable aerogel comprising a nonmetallic interior layer 502 and a metallic oxide exterior layer 503 surrounding the nonmetallic interior layer 502. In an illustrative embodiment, the aerogel comprises Carbon, Nitrogen, Oxygen, and a metal oxide, as shown in Table 2. In an illustrative embodiment, the percentage of Carbon within the aerogel can range from 85-92%, the percentage of Nitrogen within the aerogel can range from 1-5%, the percentage of Oxygen within the aerogel can range from 4-10%, and the percentage of metal oxide within the aerogel can range from 0-3%.

TABLE 2

| Example of Aerogel Composition Table (atomic %) | |
| --- | --- |
| Carbon | 85-92 |
| Nitrogen | 1-5 |
| Oxygen | 4-10 |
| Metal Oxide | 0-3 |

Figure 6:
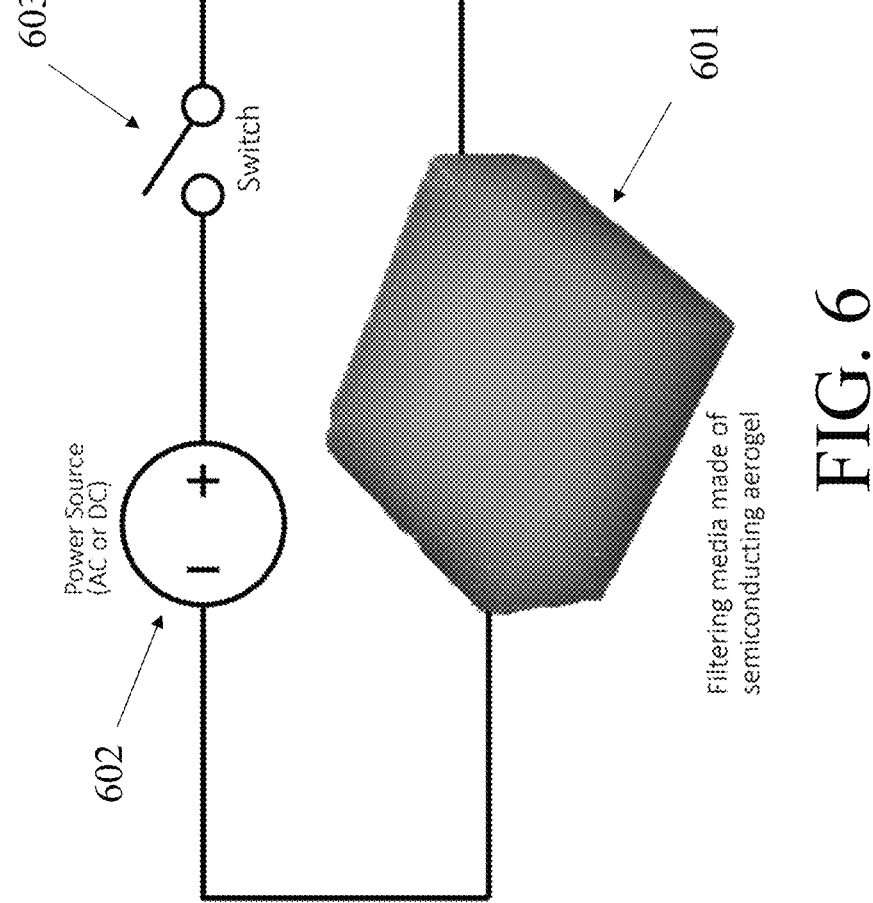
FIG. 6 shows an aerogel filtering media comprising a semiconducting aerogel connected to a power source with a customizable switch.

FIG. 6 shows an aerogel filtering media comprising a semiconducting aerogel 601 connected to a power source 602 with a customizable switch 603. In an illustrative embodiment, the protective facemask 301 comprises an air-permeable semiconducting aerogel 601 connected to a power source 602 with a customizable switch 603. In an illustrative embodiment, the semiconducting material is a chalcogenide aerogel. In an illustrative embodiment, the chalcogenide comprises a metallic element and a member of the chalcogenide family (elements under oxygen, sulfur, selenium, and tellurium). In an illustrative embodiment, the chalcogenide comprises cadmium sulfide, cadmium selenide, cadmium telluride, zinc sulfide, and lead telluride. In an illustrative embodiment, the power source 602 is a battery, electrical plug, solar power, or the like. In an illustrative embodiment, the customizable switch 603 is a power switch that provides power to the semiconducting aerogel 601. In an illustrative embodiment, when power is applied to the semiconducting aerogel 601 via the power source 602, it causes the semiconducting aerogel 601 to conduct electricity, which in turn can inhibit microbial growth and can kill and pathogens that make contact with the semiconducting aerogel 601.

In an illustrative embodiment, the protective facemask 301 can include more than one layer of aerogels. In an illustrative embodiment, the protective mask comprises a first layer comprising one or more layers of an air-permeable aerogel comprising a nonmetallic interior layer and a metallic exterior layer surrounding the nonmetallic interior layer; and a second layer comprising an air-permeable semiconducting aerogel connected to a power source with a customizable switch. In an illustrative embodiment, the protective mask comprises a first layer comprising one or more layers of an air-permeable aerogel comprising a nonmetallic interior layer and a metallic exterior layer surrounding the nonmetallic interior layer, and a second layer comprising one or more layers of an air-permeable aerogel comprising a nonmetallic interior layer and a metallic oxide exterior layer surrounding the nonmetallic interior layer. In an illustrative embodiment, the protective mask 301 comprises one or more layers of an air-permeable metallic aerogel 102, as shown in FIG. 1. In an illustrative embodiment, the layers can be incorporated into a respirator filter. In one embodiment, one or more layers are incorporated into a facemask or respirator filter to protect a user from nanometric airborne particles, harmful chemicals used in industry, and the like. The filter is reusable and the pore size can be customized to deny entry to almost any size of particulate that is desired.

Although the invention has been described in detail with reference to certain preferred embodiments, variations and modifications exist within the spirit and scope of the invention as described and defined in the following claims.

The invention claimed is:

1. A protective mask comprising, a first layer comprising one or more layers of an air-permeable aerogel comprising a nonmetallic interior layer and a metallic exterior layer surrounding said nonmetallic interior layer; and a second layer comprising an air-permeable semiconducting aerogel connected to a power source with a customizable switch.

2. The protective mask of claim 1, wherein said air-permeable aerogel further comprises a pore size in the range of 0.1 to 100 nanometers.

3. The protective mask of claim 1, wherein said nonmetallic interior layer comprises Carbon, Nitrogen, and Oxygen.

4. The protective mask of claim 3, wherein said nonmetallic interior layer by weight consists of 85-92% Carbon, 1-5% Nitrogen, and 4-10% Oxygen.

5. The protective mask of claim 1, wherein said metallic exterior layer comprises a metal.

6. The protective mask of claim 1, wherein said metallic exterior layer comprises copper or a copper alloy.

7. The protective mask of claim 1, wherein said nonmetallic interior layer is doped with a metal to form said metallic exterior layer.

8. The protective mask of claim 1, wherein said nonmetallic interior layer is doped with a metal oxide to form said metallic exterior layer.

9. The protective mask of claim 1, wherein said semiconducting aerogel comprises a metal chalcogenide aerogel.

10. The protective mask of claim 1, wherein said power source comprises a battery, a power plug, or a solar panel.

11. The protective mask of claim 1, wherein said customizable switch comprises a power switch.

12. The protective mask of claim 1, wherein said layers are incorporated into a respirator filter.

\* \* \* \* \*